(12) United States Patent
Vanden Bos et al.

(10) Patent No.: US 11,759,016 B2
(45) Date of Patent: Sep. 19, 2023

(54) REMOVABLE CUSHION FOR A CHAIR, MOLD FOR MAKING A CUSHION AND A CHAIR HAVING A REMOVABLE CUSHION

(71) Applicant: Vanco Products, LLC, Marco Island, FL (US)

(72) Inventors: John Vanden Bos, Marco Island, FL (US); Richard Claypool, Grand Haven, MI (US)

(73) Assignee: Vanco Products LLC, Marco Island, FL (US)

(\*) Notice: Subject to any disclaimer, the term of this patent is extended or adjusted under 35 U.S.C. 154(b) by 0 days.

(21) Appl. No.: 17/517,256

(22) Filed: Nov. 2, 2021

(65) Prior Publication Data

US 2022/0053938 A1 Feb. 24, 2022

Related U.S. Application Data

(62) Division of application No. 16/776,494, filed on Jan. 29, 2020, now Pat. No. 11,160,381.

(60) Provisional application No. 62/798,317, filed on Jan. 29, 2019.

(51) Int. Cl.
*A47C 7/00* (2006.01)
*A47C 7/02* (2006.01)
*A47C 31/02* (2006.01)
*F16B 1/00* (2006.01)

(52) U.S. Cl.
CPC ............ *A47C 7/021* (2013.01); *A47C 31/023* (2013.01); *F16B 1/00* (2013.01); *F16B 2001/0035* (2013.01)

(58) Field of Classification Search
CPC ......... A47C 7/00; A47C 7/021; A47C 7/0213; A47C 31/003; A47C 31/02; A47C 31/023; A47C 7/18; F16B 1/00; F16B 2001/0035
See application file for complete search history.

(56) References Cited

U.S. PATENT DOCUMENTS

| | | | |
|---|---|---|---|
| 7,014,267 B1 * | 3/2006 | Nagar | A47C 13/005 297/440.14 |
| 10,667,613 B2 * | 6/2020 | Harris | A47C 27/14 |
| 11,160,381 B2 * | 11/2021 | VandenBos | A47C 7/021 |
| 11,344,127 B2 * | 5/2022 | Rawls | H02S 30/20 |
| 2005/0160534 A1 * | 7/2005 | Akeno | A44B 18/0076 5/652 |
| 2010/0162535 A1 * | 7/2010 | Cheng | B29C 44/1261 24/306 |

(Continued)

*Primary Examiner* — Chi Q Nguyen
(74) *Attorney, Agent, or Firm* — The Watson IP Group, PLC; Jovan N. Jovanovic (57) ABSTRACT

A removable cushion for a chair having an outer surface and an inner foam, as well as at least one magnetic member. The inner foam and the outer surface are formed from the same polymer, with the outer surface forming an integral skin over the inner foam. The outer surface defines an upper surface and a lower surface. The lower surface is structurally configured to be positioned in an abutting relationship with a seating surface of a chair. The at least one magnetic member is embedded within one of the outer surface and the inner foam, the at least one magnetic member positioned closer to the lower surface than the upper surface of the outer surface. A chair having the cushion, and a mold is likewise disclosed, as is a method of manufacturing the cushion.

5 Claims, 7 Drawing Sheets

(56) References Cited

U.S. PATENT DOCUMENTS

| | | | | |
|---|---|---|---|---|
| 2014/0182060 A1* | 7/2014 | Mikkelsen | ............ | A47C 21/026 5/400 |
| 2016/0262543 A1* | 9/2016 | Currie | .................... | A47C 7/425 |
| 2019/0142166 A1* | 5/2019 | Harris | .................... | A47C 27/14 297/452.1 |
| 2019/0274432 A1* | 9/2019 | Rawls | ...................... | A47C 7/72 |
| 2022/0183463 A1* | 6/2022 | Solomon | ................ | A47B 85/04 |

* cited by examiner

REMOVABLE CUSHION FOR A CHAIR, MOLD FOR MAKING A CUSHION AND A CHAIR HAVING A REMOVABLE CUSHION

CROSS-REFERENCE TO RELATED APPLICATION

The present application is a divisional of U.S. patent application Ser. No. 16/776,494 filed on Jan. 29, 2020, entitled "REMOVABLE CUSHION FOR A CHAIR, MOLD FOR MAKING A CUSHION AND A CHAIR HAVING A REMOVABLE CUSHION", which claims priority from U.S. Provisional Patent App. Ser. No. 62/798,317 filed on Jan. 29, 2019, entitled "Removable Cushion For A Chair, Mold For Making A Cushion And A Chair Having A Removable Cushion", the entire disclosure of which is hereby incorporated by reference in its entirety.

BACKGROUND OF THE DISCLOSURE

1. Field of the Disclosure

The disclosure relates in general to furniture components, and more particularly, to a removable cushion for a chair. Such a cushion is magnetically coupled to an underlying seating surface of a chair. Likewise, the disclosure relates to a mold for making the removable cushion and a chair having a removable cushion.

2. Background Art

The previous methods involved using hook and loop, and snaps to connect the cushion to the chair. These hook and loop and snap methods create issues with cleaning, durability, and replacement. Cushions without the integral skin have issues with cleanliness. The stitches used to close the cushion will collect dirt, debris, and bacteria.

In many restaurants, bars and other locations, it has been common to utilize steel or other ferromagnetic chairs that are typically formed through stamping operations. Such chairs, while useful and inexpensive, lack comfort. In some instances, solutions have been developed to provide cushions to such chairs. It would be advantageous to provide cushions that are easy to attach and detach, clean and rugged, while being comfortable.

SUMMARY OF THE DISCLOSURE

The disclosure is directed to a removable cushion for a chair comprising an outer surface and an inner foam, and at least one magnetic member. The inner foam and the outer surface formed from the same polymer, with the outer surface forming an integral skin over the inner foam. The outer surface defining an upper surface and a lower surface. The lower surface structurally configured to be positioned in an abutting relationship with a seating surface of a chair. The at least one magnetic member embedded within one of the outer surface and the inner foam. The at least one magnetic member positioned closer to the lower surface than the upper surface of the outer surface.

In some configurations, the lower surface further includes an outer perimeter, with each of the at least one magnetic member being spaced apart from the outer perimeter.

In some configurations, the magnetic member has an outward facing surface that is substantially parallel to the lower surface and spaced therefrom.

In some configurations, the removable cushion includes an opening corresponding to each of the at least one magnetic member. The opening extends from the lower surface to the outward facing surface thereby exposing at least a portion of the at least one magnetic member therewithin.

In some configurations, the outer surface sealingly engages the outward facing surface of the at least one magnetic member about the opening.

In some configurations, the at least one magnetic member further comprises a plurality of magnetic members spaced apart from each other.

In some configurations, the at least one magnetic member is space apart from the lower surface a distance between 0 and 10 mm.

In another aspect of the disclosure, the disclosure is directed to a chair comprising a seating surface and a support structure extending from the seating surface and structurally configured to engage the ground. Additionally, the removable cushion described above can be disposed on the seating surface and releasably magnetically coupled thereto.

In another aspect of the disclosure, the disclosure is directed to a mold for a cushion comprising: a first mating mold portion; a second mating mold portion, with the first mating mold portion and the second mating mold portion collectively defining a cavity; and at least one adjustable magnet positioning post extending from a wall of the second mating mold portion and extending into the cavity.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 4:
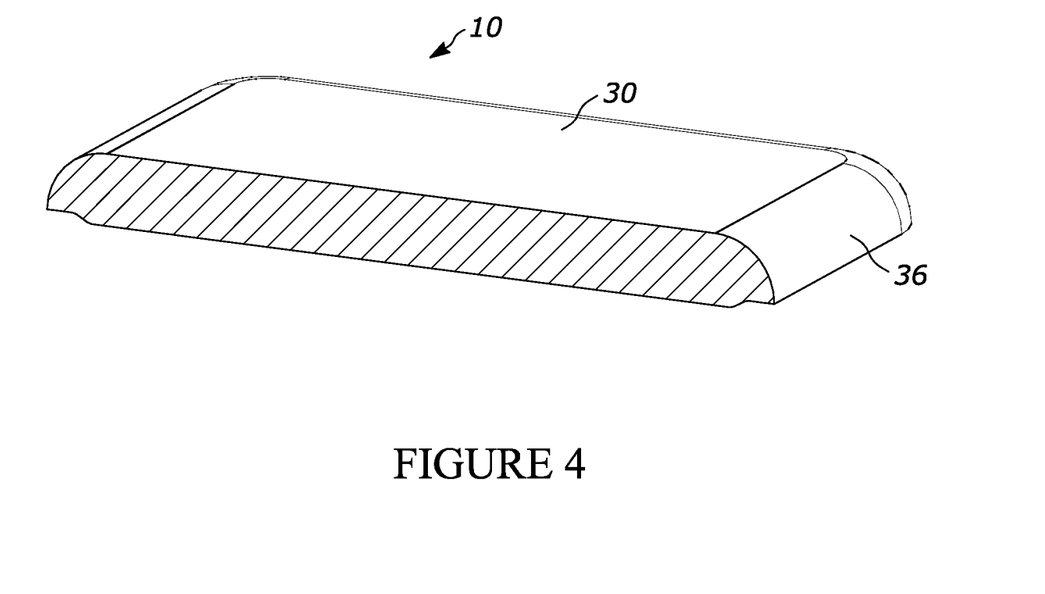
FIG. 4 of the drawing is a perspective cross-sectional view of the removable cushion of the present disclosure.
Figure 5:
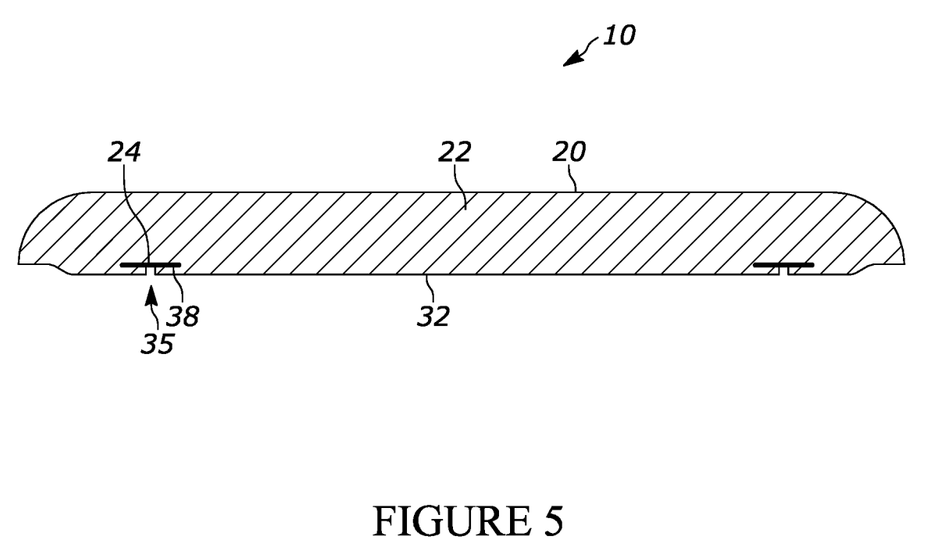
FIG. 5 of the drawings is a cross-sectional view of the removable cushion of the present disclosure.
Figure 6:
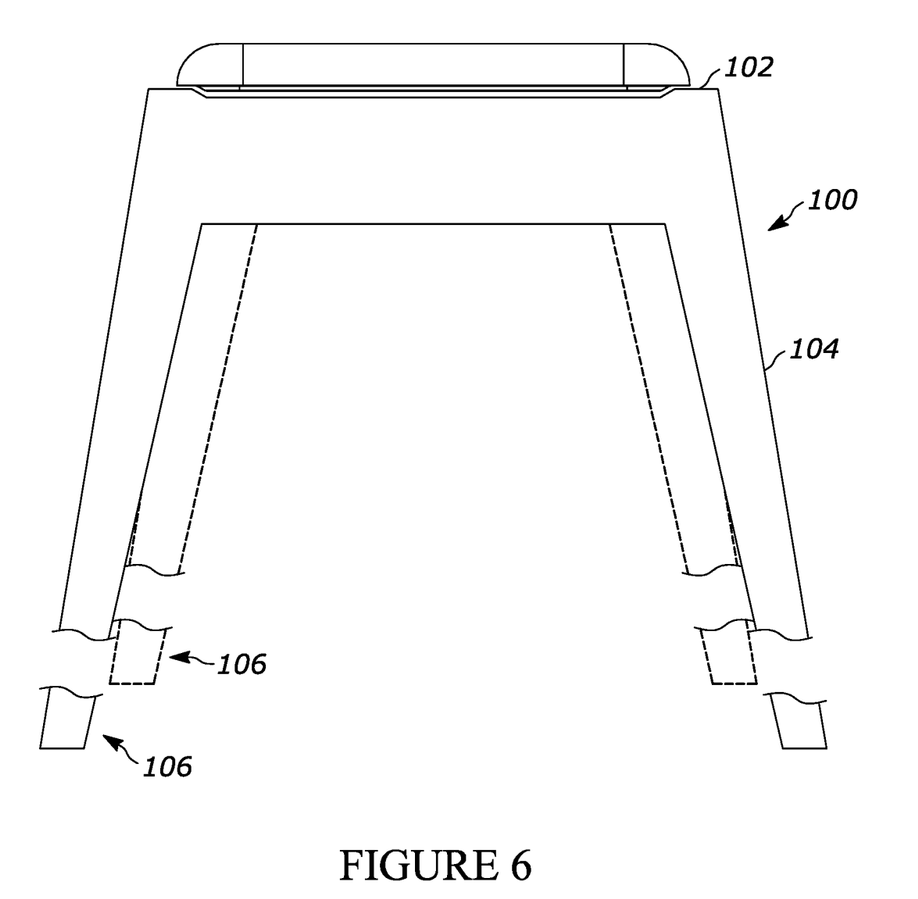
FIG. 6 of the drawings is a partial cross-sectional view of a chair having a removable cushion removably coupled thereto.

Referring now to the drawings and in particular to FIGS. 1 through 5, a removable cushion for a chair is shown at 10, and in the environment of a chair in FIG. 6. Specifically, the cushion 10 is intended for use in association with a chair, such as chair 100, shown in FIG. 6. The chair 100 includes a seating surface 102 and a support structure 104, such as legs 106. Of course, the disclosure is not limited to use in association with the chair shown, and a number of different types of chair configurations are contemplated. It will be understood that the seating surface includes ferromagnetic sections or portions so as to be compatible with the magnetic member 24 within the chair 10.

The cushion 10 comprises an outer surface 20, an inner foam 22 and a magnetic member 24. It is contemplated that the cushion is formed from a self skinning material, such that the outer surface and the inner foam are integrally and substantially simultaneously formed. The outer surface 20 includes an upper surface 30, lower surface 32, joining surfaces 34. As indicated above, the outer surface 20 and inner foam 22 generally comprise the same material where the outer surface 20 forms an integral skin over the inner foam 22. The upper surface 30 and lower surface 32 are spaced apart by the joining surfaces 34 and the inner foam is positioned therebetween. The lower surface is designed to interface with the seating surface 102 of the chair. It is contemplated that the cushion may be formed utilizing BASF Elastafoam 37720R available from BASF Corporation. Of course, other urethane based materials, among other types of polymers, are also contemplated. It will be understood that the disclosure is not limited to the particular polymer(s) identified.

The outer surface 20 is preferably contoured around the upper surface 30 and chamfered around the lower surface 32. This lower surface 32 includes the chamfer design which is configured to generally correspond in shape to the seating surface 102 of the chair 100. The upper surface 30 configuration which includes a contouring structure is configured to provide comfort and support. This outer surface is supported by inner foam in that the outer surface encases the inner foam. The outer surface may be given a designed texture capable of comfort and/or ease of cleaning and wiping down. The particular contour of the outer surface is not to be deemed limiting but the configurations shown are meant to be exemplary.

Additionally, the upper surface 30, in the configuration shown, is generally parallel to the lower surface 32. The upper surface 30 is spaced apart from the lower surface 32 through joining surfaces 34 and supported by the inner foam 22. The joining surfaces 34 generally define the outer perimeter of the cushion 10.

Figure 2:
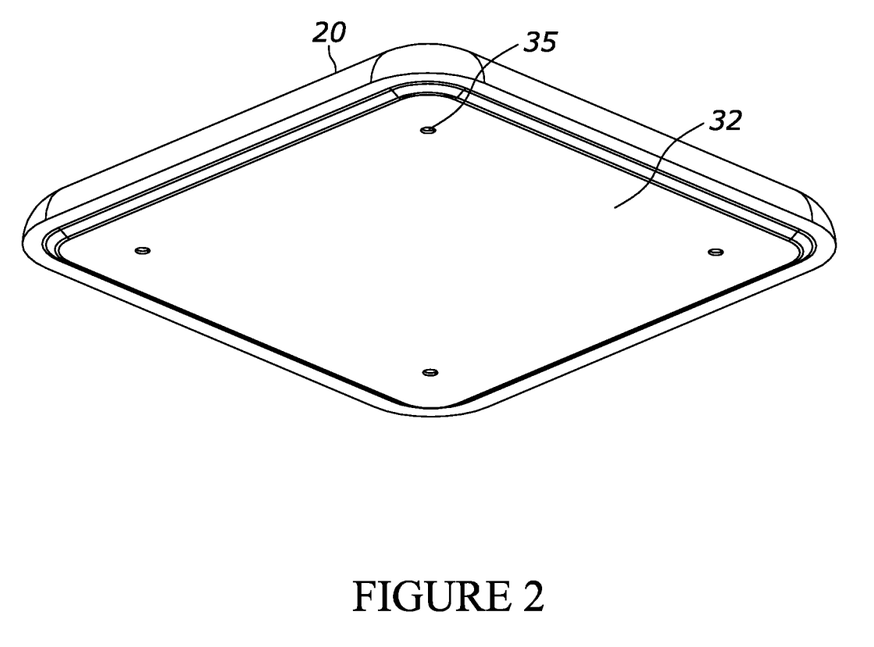
FIG. 2 of the drawings is a bottom perspective view of the removable cushion of the present disclosure.

Extending through the lower surface, and defined by the lower surface and/or the inner foam, are openings, such as magnet openings 35. As will be explained below, these openings provide access to the magnetic member 24, and are present, in part due to the manufacturing method.

The inner foam 22 is generally defined as internal to the outer surface. This inner foam is integrally formed, as identified above, with the outer surface in a single molding operation. Thus, the two structures, namely, the outer surface and the inner surface meet and transition from one to the other. Depending on the configuration, the thickness of the outer surface can be varied. While of the same material, the outer surface is generally of a different density and resistant to moisture penetration, and, is protective of the inner foam. Generally, the inner foam is not exposed through the outer surface.

The cushion 10 includes at least one magnetic member encased therewithin. The magnet being a neodymium rare-earth magnet disc. The magnetic members 24 have an outward facing surface 38. Generally, the magnetic members comprise a disc-like member that has a generally circular cross-sectional configuration and a generally uniform thickness. In the configurations shown, the outward facing surface 38 is positioned so as to be generally parallel with the lower surface 32 and spaced inboard of the lower surface 32. A magnetic opening 35 extends through the lower surface of the outer surface and provides communication to the outward facing surface 38. It will be understood that depending on the depth of the opening, the magnetic member may be encased within the outer surface, the inner foam or partially within each. It will further be understood that the region surrounding the opening is firmly mated (that is attached) to the outward facing surface 38. In the present configuration, each of the magnetic members has a diameter of approximately 2 mm and 30 mm, and more preferably between 5 and 15 mm and a thickness of 0.5 mm and 5 mm. It will be understood that the magnetic members are not limited to such a diameter or thickness, and that these dimensions are provided solely for illustrative purposes.

Figure 1:
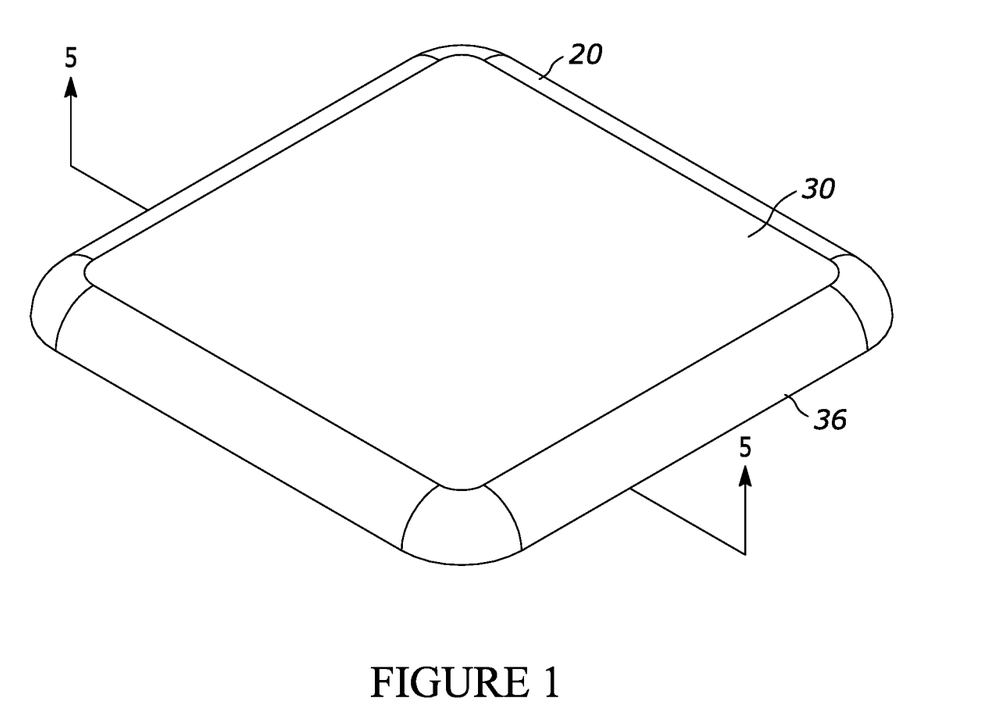
FIG. 1 of the drawings is a top perspective view of a removable cushion of the present disclosure.
Figure 3:
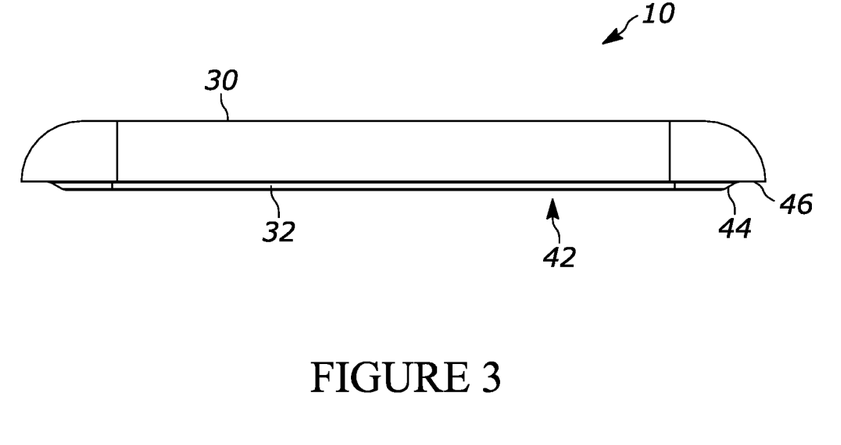
FIG. 3 of the drawings is a side elevational view of the removable cushion of the present disclosure.

While a number of different configurations are contemplated, a total of four magnetic members are shown in the configuration of FIGS. 1 through 3, with the four generally corresponding to the corners of the generally rectangular configuration of the cushion. It will be understood that the magnetic members are generally spaced apart from the outer perimeter and the joining surfaces 34, and generally closer to the lower surface 32 than the upper surface 30. The particular position and depth of the magnetic members can be varied within the scope of the present disclosure.

Figure 7:
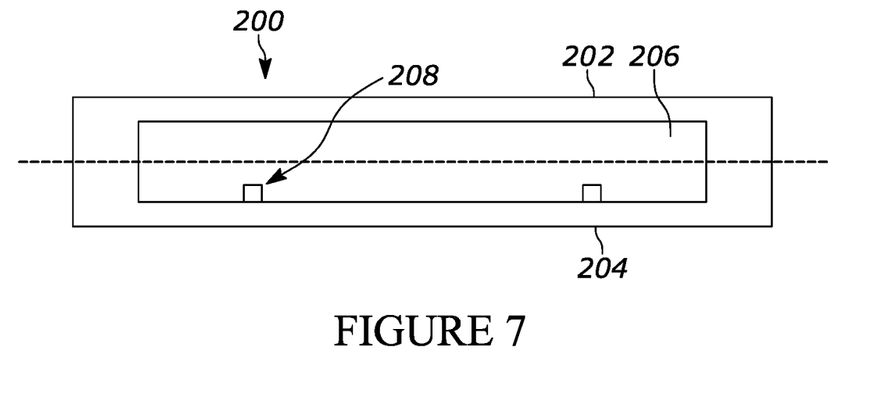
FIG. 7 of the drawings is a cross-sectional view of a mold used for making the removable cushion of the present disclosure.
Figure 8:
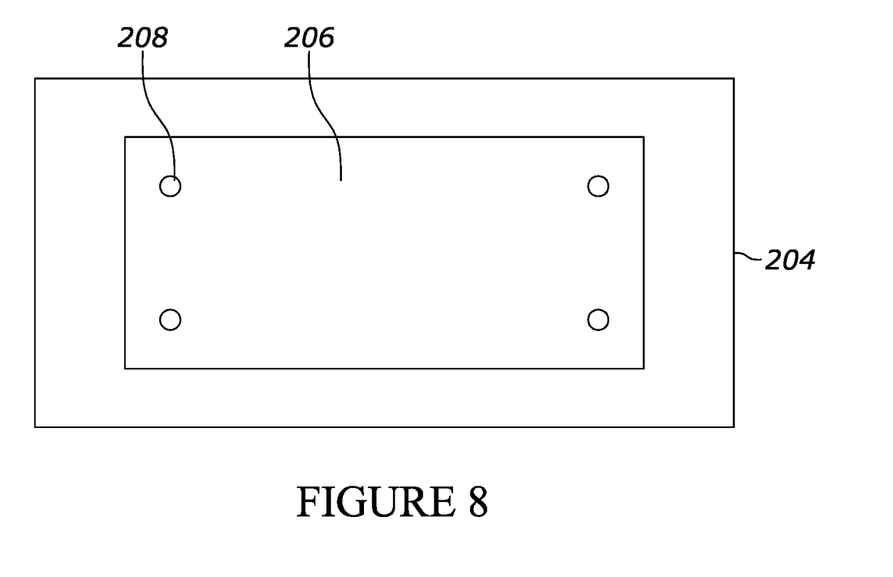
FIG. 8 of the drawings is a top plan view of the second mating portion of the mold.

With reference to FIGS. 7 and 8, the cushion is built in a two part mold 200 comprising a first mating mold portion 202 and a second mating mold portion 204. These mold portions define a cavity 206. Extending from the second mold portion 204, are adjustable magnetic positioning posts, such as adjustable magnet positioning post 208. In the configuration shown, the upper surface of the magnetic positioning post is generally flat and configured to receive and retain a magnetic member 24 so as to position the magnetic member during the molding process. The first and second mating mold portions are made from a metal material allowing for heat transfer to make sure that the foam parts have enough time to complete the chemical reaction. Mold release is applied to the mold to keep the cushion from becoming stuck in the mold when the cure time is complete.

The adjustable magnet positioning posts 208 extend generally perpendicularly from the second mating mold portion. The adjustable magnetic positioning posts comprises threaded members that can be threaded into a corresponding threaded bore int eh second mating mold portion. As such, one can rotate the adjustable magnetic positioning post in a clockwise or counter clockwise direction to extend or retract the post within the cavity 206. It will be understood that depending on the position and orientation of the post, the depth of the one or more magnets in the cushion can be varied within the cavity. It is contemplated that the magnetic member is positioned so that the outward facing surface is between 0 and 10 mm below the lower surface. It will also be understood that in the place of threads, a number of different dowel like structures can be provided, and inserted into corresponding bores within the second mating mold portion. In other words, a number of kits comprising dowels of varying length can be provided to achieve various configurations and placements of the magnetic members within the cushion.

In operation, the mold is opened, and the adjustable magnetic positioning posts can be adjusted as desired. Once adjusted as desired, a magnetic member can be placed on each of the posts. As the posts are ferromagnetic, the magnetic members are attracted to the posts and generally remain in the same position as when they are set. In addition, due to the relative strength of the magnets, without some force (generally greater that is observed in the molding process) is imparted onto the magnets, the magnets will remain in the set position.

Once the magnets are set, the urethane can be injected into the mold. Generally, the injection is done as a two part chemical insertion, where the chemicals are mixed as they are inserted. The mold is then closed, and the reaction takes place, thereby expanding the material and forming the outer surface and the inner foam. During the process, the magnetic members generally do not move relative to the mold, and are encased by the inner foam and/or the outer surface until the only access to the magnetic members is preferably through the magnet openings 35 which are formed by the adjustable magnetic positioning posts.

Once completed, the cushion can be removed from the chair and utilized. That is, the cushion may be positioned on the seating surface 102 of a chair 100. In such a configuration, the magnetic member(s) are drawn to the ferromagnetic portions of the seating surface and generally provide the force necessary to maintain the cushion in the desired orientation relative to the chair. Of course, a user can exert a pulling force so as to disconnect the cushion from the chair when it becomes desirable to clean or to otherwise remove the same. The cushion can be removed and replaced as many times as desired without negatively impacting the cushion or the chair.

It is noted that the chair may have an indented portion in the upper surface thereof. Additionally, the cushion may have a protruded section 42, a shelf 46 and a chamfered portion 44 so as to follow the contours of the surface of the chair, while extending beyond the indented portion of the chair. This may further enlarge the surface area of the cushion as a seating surface while following the contours of the upper surface of the chair, to, in turn, further facilitate retention and reducing sliding between components.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A mold for a cushion comprising:
   a first mating mold portion;
   a second mating mold portion, with the first mating mold portion and the second mating mold portion collectively defining a cavity; and
   at least one adjustable magnet positioning post extending from a wall of the second mating mold portion and extending into the cavity, the at least one adjustable magnet positioning post together with the wall of the second mating portion defining a height of the at least one adjustable magnet positioning post, with the height of the at least one adjustable magnet positioning post being adjustable so as to alter a distance of an upper surface of the at least one adjustable magnet positioning post from the wall of the second mating portion.

2. The mold for a cushion of claim 1 wherein the at least one adjustable magnet positioning post comprising at least four adjustable magnet positioning posts.

3. The mold for a cushion of claim 1 wherein the first mating mold portion and the second mating mold portion each comprises a metal member, and the at least one adjustable magnet positioning post comprises a ferromagnetic material.

4. The mold for a cushion of claim 1 wherein the at least one adjustable magnetic positioning post includes a flat upper surface.

5. The mold for a cushion of claim 1, wherein the at least one adjustable magnetic positioning post extends perpendicularly from the second mating mold portion.

\* \* \* \* \*